Sept. 1, 1959 G. H. SCHWARTZTRAUBER 2,901,856
CONNECTOR FOR A FISH LINE AND FISH HOOK
Filed March 7, 1956
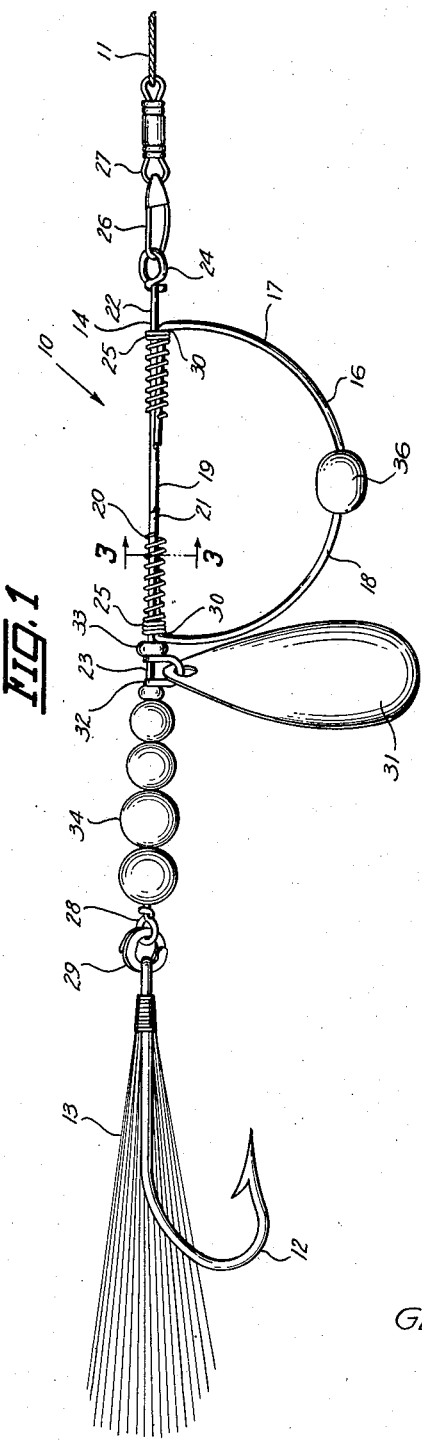
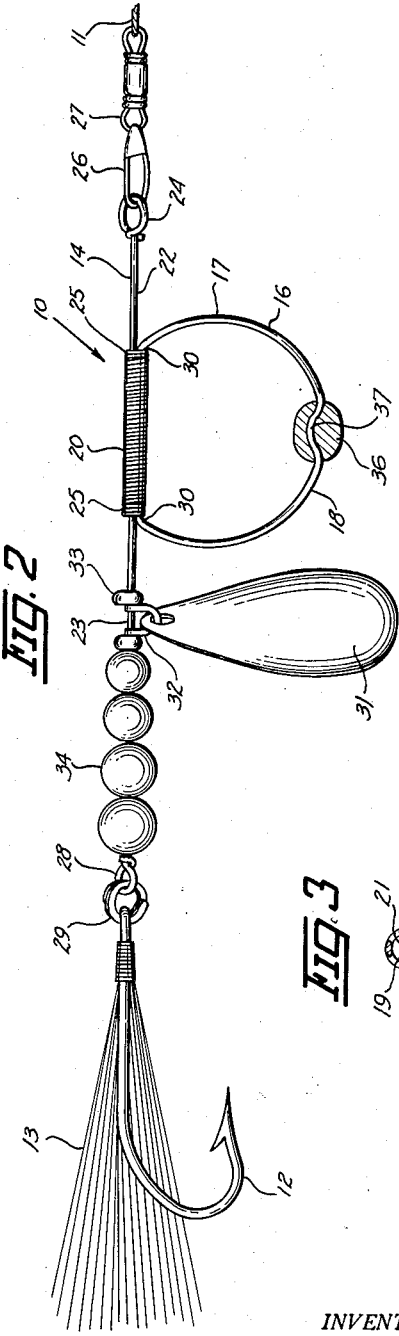
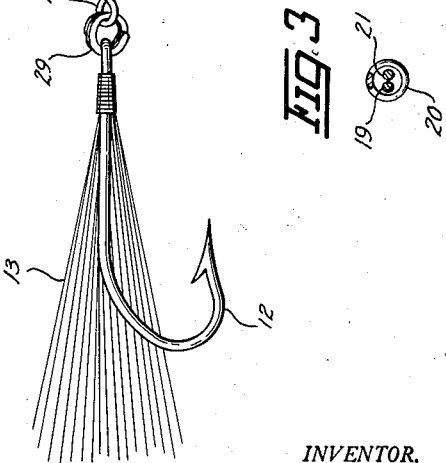
INVENTOR.
GEORGE H. SCHWARTZTRAUBER
BY
Rudolph L. Lowell
ATTORNEY.

2,901,856
CONNECTOR FOR A FISH LINE AND FISH HOOK

George H. Schwartztrauber, West Des Moines, Iowa

Application March 7, 1956, Serial No. 570,017

3 Claims. (Cl. 43—42.72)

This invention relates generally to fishing tackle and more particularly to a connector for a fish line and a fish hook.

An object of this invention is to provide an improved connector for a fish line and a fish hook.

A further object of this invention is to provide a yieldable connector for a fish hook and fish line which acts to spring the hook into the mouth of a fish pulling on the hook.

Another object of this invention is to provide a connector for a fish hook and a fish line which cooperates with the usual drag in the fish line to maintain the hook in the mouth of a fish on the hook when the fish jumps or turns in attempting to release itself from the hook.

A further object of this invention is to provide a connector for a fish hook and a fish line which includes spring means providing for a yieldable movement of the hook in a direction away from the line.

Yet a further object of this invention is to provide a connector for a fish hook and a fish line which is economical to manufacture, simple in construction, and efficient in operation to provide for the hooking of a fish and a maintaining of the fish on the hook.

Further objects, features and advantages of this invention will become apparent from a consideration of the following description when taken in connection with the accompanying drawing in which:

Fig. 1 is a side elevational view of the connector of this invention, shown in assembly relation with a fish hook and a fish line, and showing a spring portion of the hook in a normal extended condition, with some parts broken away for the purpose of clarity;

Fig. 2 is a side elevational view of the connector of this invention, illustrated similarly to Fig. 1, and showing the spring portion of the connector in a contracted condition; and Fig. 3 is a transverse sectional view looking along the line 3—3 in Fig. 1.

With reference to the drawing, the connector of this invention, indicated generally at 10, is illustrated in Fig. 1 in assembly relation with a fish line 11 and a fish hook 12 provided with a buck tail 13. The connector 10 consists of a wire body member 14 having an intermediate portion 16 thereof return or reversely bent upon itself to form a closed loop 17. As shown in Fig. 1, in which the loop 17 is illustrated in its normal expanded condition, the loop 17 is of an irregular shape, having a curved intermediate section 18 and a pair of straight end sections 19 and 21 (Fig. 3), arranged in a side by side relation. The body member 14 further includes a pair of substantially straight terminal portions 22 and 23 which form outward extensions of the loop end sections 19 and 21, respectively.

Positioned about the loop end sections 19 and 21 is an elongated spring member 20 having the ends 25 thereof positioned against the bends in the body member 17 at the junctures 30 of the end sections 19 and 21 with the intermediate section 18. The spring 20 is in compression so as to normally urge the junctures 30 away from each other and yieldably resist any contraction of the loop 17. The arrangement of the loop end sections 19 and 21 within the spring 20 prevents any expansion of the loop 17 beyond that illustrated in Fig. 1.

The terminal portion 22 of the body member 14 is formed with a loop 24 which is connected by means of a hasp 26 to the end 27 of the fish line 11. The terminal portion 23 of the body member 14 is substantially longer than the portion 22 and is likewise formed with a loop 28 which is attached by means of a split ring 29 to the hook 12.

A spinner blade 31, of a usual form, is rotatably mounted on the terminal portion 23 of the body member 14 at a position adjacent the loop 16 by means of a U-shape supporting member 32. A bead 33 on the end portion 23 separates the support 32 and the loop 16 to prevent the spinner blade 31 from becoming entangled or caught in the loop 17. A plurality of beads 34 assembled on the terminal portion 23 at a position between the spinner blade 31 and the loop 28 maintain the spinner blade 31 a desired distance away from the hook 12.

In use, a lead sinker 36 pressed onto the loop 17 at a kink or small inwardly offset bend 37 formed at substantially the center of the curved portion 18 of the loop 17 maintains the loop 17 in an upright position in the water. As a result, the chances of the loop 17 becoming entangled in material in the lake bottom is substantially reduced.

When a fish takes the hook 12 in its mouth and pulls, the spring 20 is compressed and the loop 17 is contracted, with the amount of such compression and contraction depending upon the force exerted by the fish on the fish hook 12. As best appears in Fig. 3, the loop 17 is contractible to a substantially circular configuration in which the spring 20 is fully compressed. Such contraction of the loop 17 acts to give the fish an immediate play or movement of the hook 12. As soon as the fish lets up or reduces its pulling efforts, the spring 20 immediately extends and the loop 17 opens or expands to more or less spring the hook 12 further into the mouth of the fish to prevent escape of the fish from the hook 12. It is apparent that the action of the spring 20 and the loop 16 complement each other since the spring acts to expand the loop 16 and the expansion of the loop 16 in turn acts to provide for extension of the spring 20.

In addition, the connector 10 cooperates with the drag in the fish line 11 to keep the hook 12 in the fish's mouth when the fish jumps or turns by maintaining a tension on the line 11. In other words, the connector 10 acts to maintain the hook 12 in the mouth of the fish when the fish jumps by counteracting any slack in the fish line 11.

From the above description, it can be seen that this invention provides a resilient connector 10 for use with a fish hook 12 and a fish line 11. By virtue of the unitary construction of the body member 14, it is readily formed and assembled with the spring 20.

Although the invention has been described with respect to a preferred embodiment thereof, it is to be understod that it is not to be so limited, since changes can be made therein which are within the scope of this invention as defined by the appended claims.

I claim:

1. For use with a fish line and a fish hook, a connector comprising a wire body member having an intermediate portion and a pair of end portions, said intermediate portion being return bent upon itself to form a closed loop, with said end portions being extended outwardly from said loop on opposite sides thereof, coil spring means operatively associated with said loop so as to yieldably resist closing of said loop, said spring means being positioned so that said body member end portions extend outwardly from opposite ends of said spring means, and means on said body member for securing said fish line and fish hook to opposite ends thereof.

2. A fishing device for attachment to a fish line comprising a unitary wire body member having an intermediate portion thereof reversely bent upon itself to form an extensible and contractible closed loop having a pair of substantially straight end sections arranged in a side by side relation in an extended condition of said loop, coil spring means extended about said end sections for resiliently biasing said loop toward the extended condition therefor, said body member having end portions thereof constituting extensions of said end sections and arranged on opposite sides of said loop, means connecting one of said end portions to said fish line, a fish hook connected to the other one of said end portions, a spinner member on one of said end portions between said loop and said fish hook and bead members on said one end portion on opposite sides of said spinner for maintaining the spinner in a spaced relation with said loop and said hook.

3. A connector for a fish hook and a fish line comprising a unitary wire body member having an intermediate portion thereof bent to form an extensible and contractible loop, said loop having substantially straight end sections arranged in a side by side relation in an extended condition of said loop, a coil spring member positioned about said end sections for resiliently maintaining said loop in said extended condition and for maintaining said end sections against relative transverse movement during contraction of said loop, and means at the ends of said body member for connecting said fish hook and fish line thereto.

References Cited in the file of this patent

UNITED STATES PATENTS

| | | |
|---|---|---|
| 1,741,034 | Newton et al. | Dec. 24, 1929 |
| 2,665,903 | Green | Jan. 12, 1954 |
| 2,700,843 | Werner | Feb. 1, 1955 |
| 2,754,611 | Riner | July 17, 1956 |